(12) United States Patent
van Dijk et al.

(10) Patent No.: US 8,752,146 B1
(45) Date of Patent: Jun. 10, 2014

(54) PROVIDING AUTHENTICATION CODES WHICH INCLUDE TOKEN CODES AND BIOMETRIC FACTORS

(75) Inventors: Marten van Dijk, Somerville, MA (US); Kevin D. Bowers, Melrose, MA (US); Samuel Curry, Andover, MA (US); Sean P. Doyle, Edmonds, WA (US); Nikolaos Triandopoulos, Arlington, MA (US); Riaz Zolfonoon, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 131 days.

(21) Appl. No.: 13/434,280

(22) Filed: Mar. 29, 2012

(51) Int. Cl.
G06F 21/00 (2013.01)
H04L 29/06 (2006.01)
H04L 9/32 (2006.01)
H04L 9/08 (2006.01)
G06F 21/32 (2013.01)

(52) U.S. Cl.
CPC ........ H04L 63/0861 (2013.01); H04L 63/0838 (2013.01); H04L 63/02 (2013.01); H04L 9/3231 (2013.01); H04L 29/06809 (2013.01); H04L 9/0866 (2013.01); G06F 21/32 (2013.01)
USPC ............ 726/6; 726/3; 726/4; 726/5; 713/182; 713/183; 713/184; 713/185; 713/186; 340/5.81; 340/5.82; 340/5.83; 340/5.84; 340/5.52; 382/115; 382/116; 382/117; 382/118; 382/119; 382/124

(58) Field of Classification Search
CPC .............................. H04L 63/0861; H04L 8/38
USPC ............... 713/182–186; 340/5.81–5.84, 5.52; 382/115–119, 124
See application file for complete search history.

(56) References Cited

U.S. PATENT DOCUMENTS

| 5,557,686 | A | * | 9/1996 | Brown et al. ................. 382/115 |
|---|---|---|---|---|
| 7,634,630 | B1 | | 12/2009 | Van Riel et al. |
| 7,730,321 | B2 | | 6/2010 | Gasparini et al. |
| 7,734,886 | B1 | | 6/2010 | Van Riel et al. |
| 7,848,746 | B2 | | 12/2010 | Juels |
| 7,849,323 | B2 | | 12/2010 | Field et al. |
| 7,886,345 | B2 | | 2/2011 | Kaliski et al. |
| 7,904,557 | B1 | | 3/2011 | Van Riel et al. |
| 8,060,922 | B2 | | 11/2011 | Crichton et al. |

(Continued)

OTHER PUBLICATIONS

A. Sulong, et al., NPL document, Intelligent Keystroke Pressure-Based Typing Biometrics Authentication System Using Radial Basis Function Network, 2009, IEEE.*

*Primary Examiner* — Taghi Arani
*Assistant Examiner* — Josnel Jeudy
(74) *Attorney, Agent, or Firm* — BainwoodHuang (57) ABSTRACT

A technique provides authentication codes to authenticate a user to an authentication server. The technique involves generating, by an electronic apparatus (e.g., a smart phone, a tablet, a laptop, etc.), token codes from a cryptographic key. The technique further involves obtaining biometric measurements from a user, and outputting composite passcodes as the authentication codes. The composite passcodes include the token codes and biometric factors based on the biometric measurements. Additionally, the token codes and the biometric factors of the composite passcodes operate as authentication inputs to user authentication operations performed by the authentication server. In some arrangements, the biometric factors are results of facial recognition (e.g., via a camera), voice recognition (e.g., via a microphone), gate recognition (e.g., via an accelerometer), touch recognition and/or typing recognition (e.g., via a touchscreen or keyboard), combinations thereof, etc.

19 Claims, 5 Drawing Sheets

(56) References Cited

U.S. PATENT DOCUMENTS

| | | |
|---|---|---|
| 8,234,696 B2 | 7/2012 | O'Malley et al. |
| 8,301,876 B2 | 10/2012 | Burch et al. |
| 8,302,201 B1 | 10/2012 | Gupta et al. |
| 8,346,926 B1 | 1/2013 | Van Riel et al. |
| 8,494,959 B2 | 7/2013 | Hathaway et al. |
| 8,495,372 B2 | 7/2013 | Bailey et al. |
| 8,499,157 B1 | 7/2013 | Juels et al. |
| 8,515,070 B2 | 8/2013 | Juels et al. |
| 8,532,300 B1 | 9/2013 | Searles |
| 8,533,460 B2 * | 9/2013 | Hird et al. ............... 713/155 |
| 8,564,453 B1 | 10/2013 | Morneau et al. |
| 2002/0144128 A1 * | 10/2002 | Rahman et al. ............ 713/186 |
| 2004/0059950 A1 * | 3/2004 | Bender et al. ............. 713/202 |
| 2004/0228503 A1 * | 11/2004 | Cutler ...................... 382/103 |
| 2005/0071635 A1 * | 3/2005 | Furuyama ................. 713/168 |
| 2009/0190802 A1 * | 7/2009 | Adams et al. ............. 382/115 |
| 2010/0138914 A1 * | 6/2010 | Davis et al. ............... 726/19 |
| 2010/0275010 A1 * | 10/2010 | Ghirardi ................... 713/155 |
| 2012/0246079 A1 * | 9/2012 | Wilson et al. ............. 705/67 |
| 2013/0194223 A1 * | 8/2013 | Ward et al. ............... 345/174 |

* cited by examiner

PROVIDING AUTHENTICATION CODES WHICH INCLUDE TOKEN CODES AND BIOMETRIC FACTORS

BACKGROUND

A conventional authentication system includes a hardware authenticator (sometimes called a token) and an authentication server which work together to grant a token holder with login access using one-time use passwords (OTPs). Such OTPs are often referred to as OTP codes, one-time passcodes, and pseudo-random numbers, among other terms. To this end, both the token and the authentication server share a cryptographic key which is not otherwise known. The token uses this key to produce a series of OTPs. Concurrently, the authentication server carries out the same operations on its end to produce the same series of OTPs. Accordingly, at any time, the token holder is capable of providing a matching OTP from the token to the authentication server to prove that the token holder possesses the token.

A soft token is a software application which installs on a computer system. Once the soft token is properly installed, the soft token provides functionality similar to that of a conventional hardware authenticator. That is, the soft token provides a user of the computer system with the ability to offer matching OTPs and thus prove to an authentication server that the user of the computer system is in possession of the soft token.

SUMMARY

It is now common for many electronic apparatus to be equipped with various input components such as digital cameras, microphones, accelerometers, touchscreens, etc. Even so, when a user delivers a code from a token to an authentication server during an authentication attempt using the above-described conventional authentication systems, the code from the token is merely an OTP.

In contrast to the above-described conventional authentication systems, an improved technique provides authentication codes which include token codes and biometric factors. Such biometric factors can be acquired from the various input circuits which are now commonly available and even offered as standard equipment on many electronic apparatus (e.g., smart phones, tablets, laptops, etc.). Accordingly, the authentication codes are now able to provide a primary channel which carries token codes and an auxiliary channel which carries the biometric factors. As a result, such operation provides the opportunity for richer (i.e., stronger) authentication as well as detection of alerts from the user.

One embodiment is directed to a method of providing authentication codes to authenticate a user to an authentication server. The method includes generating, by an electronic apparatus, token codes from a cryptographic key (e.g., a master secret, derivative keys, etc.). The method further includes obtaining biometric measurements from a user, and outputting composite passcodes as the authentication codes. The composite passcodes include the token codes and biometric factors based on the biometric measurements. Additionally, the token codes and the biometric factors of the composite passcodes operate as authentication inputs to user authentication operations performed by the authentication server.

In some arrangements, the electronic apparatus is a mobile device such as a smart phone, a tablet, a laptop, etc. which stores the cryptographic key and which runs a soft token application. In these arrangements, generating the token codes from the cryptographic key includes deriving, as the token codes, a series of one-time use passwords (OTPs) based on the cryptographic key using the soft token application. Each OTP is valid during a respective time window and invalid outside that respective time window.

It should be understood that, with the availability of processing circuitry within the electronic apparatus, biometric recognition operations can be performed locally and thus reduce the size of the biometric factors. Examples of suitable recognition operations include face recognition (e.g., via a camera), voice recognition (e.g., via a microphone), gate recognition (e.g., via an accelerometer), touch recognition and/or typing recognition (e.g., via a touchscreen or keyboard), combinations thereof, and so on. Moreover, the biometric factors can be a simple binary result (e.g., match vs. no match), a multi-bit score indicating a level of closeness between a current biometric measurement and an expected biometric measurement (e.g., low, medium, high, etc.) during a current authentication attempt, or a multi-bit biometric measurement during a current authentication attempt (e.g., a size, a length, a rate, etc.).

It should be understood that such biometric processing may assess physiological characteristics (e.g., facial geometries, hand geometries, voice qualities, etc.) as well as behavioral characteristics (e.g., typing rhythm, walking gait, swiping habits, etc.). It should be understood that such biometric processing may also assess conscious behavior such as a person's ability to react to an environment (e.g., via training of the person's implicit memory). For example, it is possible for the electronic apparatus to detect an occurrence of a deliberate mistyping and typing correction event provided by the user and, in response, output an alert to signal user distress to the authentication server such as to indicate a hostage situation.

In some arrangements, the electronic apparatus performs an initial discovery operation to determine which types of biometric input devices are available. Following such discovery, the electronic apparatus is able to take advantage of the existing biometric input devices in a variety of ways. For example, the electronic apparatus may alternate use of different biometric input devices at different times of operation (i.e., time multiplexing). As another example, the electronic apparatus may select one or more particular biometric input devices from a predefined ranking of preferred devices (i.e., using preferred biometric sources). As yet another example, the electronic apparatus may combine or consolidate biometric factors together particularly if the bandwidth of the auxiliary channel is limited.

In some arrangements, the electronic apparatus outputs the composite passcodes through a visual display (e.g., an electronic display screen). In these arrangements, the visual display provides, as a current composite passcode for a current authentication attempt, a character string sequence to the user. The character string sequence defines a current OTP and a current biometric factor. The current biometric factor defined by the character string sequence may be un-discernable to the user.

In some arrangements, the electronic apparatus outputs a composite passcode for a current authentication attempt by transmitting a character string sequence to the authentication server. These arrangements are well suited for certain types of mobile devices (e.g., a smart phone, a tablet, a laptop, and so on) which can transmit a wireless signal (e.g., Wi-Fi, cellular signals, etc.).

In some arrangements, an auxiliary channel for conveying information other than a token code may take the form of a separate pathway if such a pathway is available. Along these lines, if the electronic apparatus is a mobile device such as a smart phone or a tablet, the electronic apparatus sends the biometric factors via a signal which is separate from the token code pathway. An example alternative pathway for the auxiliary channel is a wireless signal (e.g., Wi-Fi, Bluetooth, cellular telephony, etc.). Such enhancements and modifications may provide greater bandwidth and richer biometric data than would otherwise be available in an embedded signal which carries both a token code and a set of biometric factors.

Other embodiments are directed to systems, assemblies, processing circuits, computer program products, and so on. Some embodiments are directed to various methods, electronic components and circuitry which are involved in providing authentication codes having biometric factors to authenticate a user to an authentication server.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques provide authentication codes which include token codes and biometric factors. Such biometric factors can be acquired from the various input circuits which are now commonly available and even offered as standard equipment on many electronic apparatus (e.g., smart phones, tablets, laptops, etc.). Accordingly, the authentication codes are now able to provide a primary channel which carries token codes and an auxiliary channel which carries the biometric factors. As a result, such operation provides the opportunity for richer (i.e., stronger) authentication as well as detection of alerts from the user.

Figure 1:
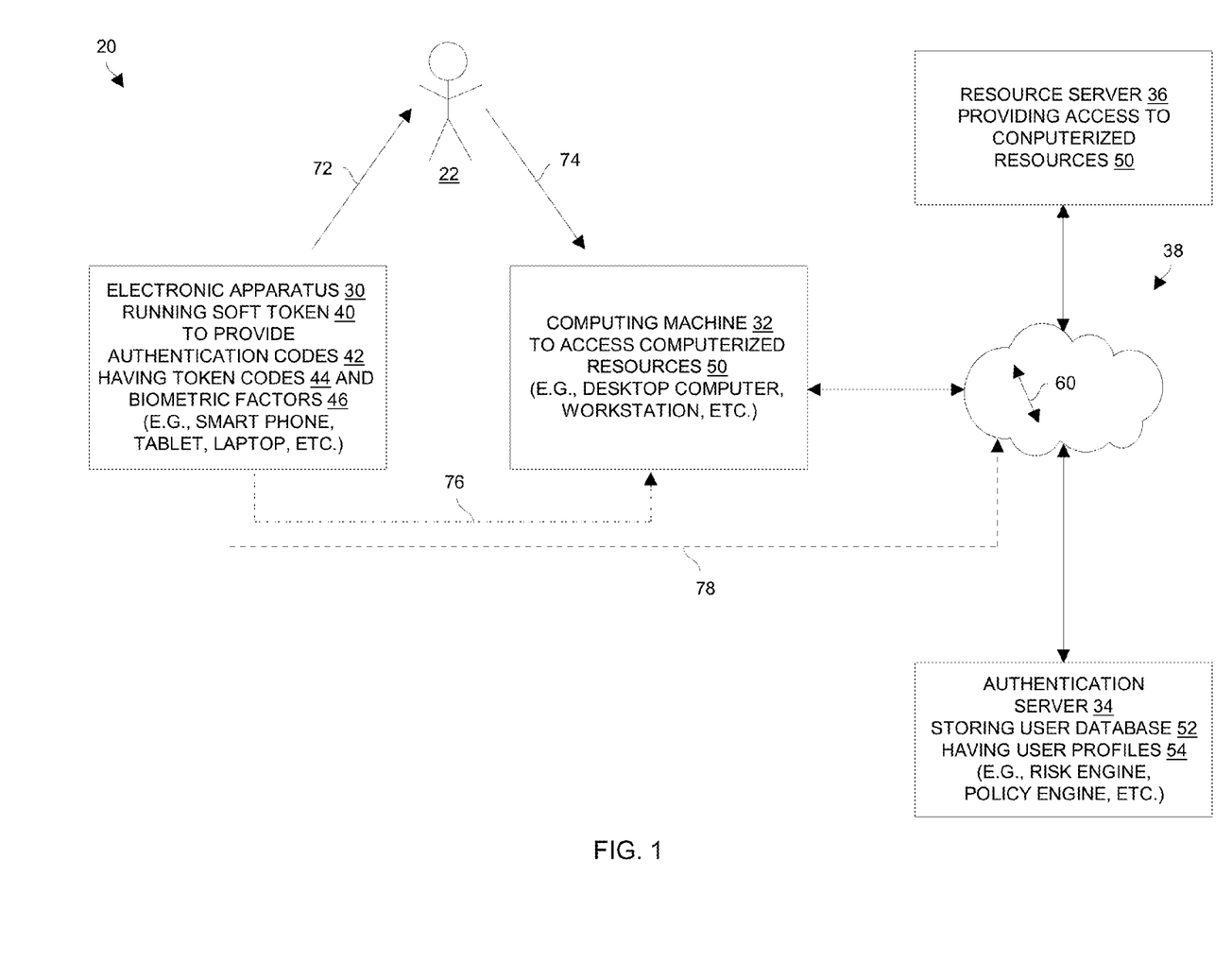
FIG. 1 is a block diagram of an electronic environment which utilizes authentication codes having biometric factors to authenticate a user to an authentication server.

FIG. 1 shows an electronic environment 20 which utilizes authentication codes having biometric factors to authenticate a user 22. The electronic environment 20 includes an electronic apparatus 30, a computing machine 32, an authentication server 34, a resource server 36, and a communications medium 38.

The electronic apparatus 30 runs a soft token 40 to provide authentication codes 42 having token codes 44 and biometric factors 46 for authenticating the user 22. Such authentication codes 42 provide a stronger means of authenticating the user 22 compared to bare conventional token codes. Examples of suitable electronic apparatus 30 include smart phones, wireless book readers, tablets, netbooks, laptops, other types of mobile devices, and general client-style devices that are capable of running the soft token 40.

The computing machine 32 is constructed and arranged to facilitate user access to a computerized resource 50. Examples of suitable computing machines 32 include desktop PCs, workstations, general purpose computers, and so on.

The authentication server 34 includes a user database 52. The authentication server 34 is constructed and arranged to store user profiles 54 for multiple users in the user database 52, and to perform authentication operations using the user profiles 54. The user profiles 54 store user-specific data defining expected authentication factors. In some arrangements, authentication server 34 includes a risk engine and/or policy engine to perform complex authentication operations based on multiple risk-based authentication factors.

The resource server 36 provides access to one or more computerized resources 50 following successful user authentication with the authentication server 34. An example of a suitable resource provider 36 is a data storage array which provides secure access to files, directories, volumes, LUNs, etc. Another example of a suitable resource provider 36 is a web server which provides secure access to various web pages. Yet another example of a suitable resource provider 36 is a server which provides secure user account and/or transactional access such as that for an online banking site, an online store, an online gaming site, and so on. Other types of resource providers 36 are suitable for use as well (e.g., ISPs, VPNs, etc.).

It should be understood that the computerized resources 50 are shown as residing on the resource provider 36 by way of example only. In other arrangements, the computerized resources 50 reside at different locations, e.g., locally on the computing machine 32, co-located at the authentication server 34, within the electronic apparatus 30, etc.

The communications medium 38 connects the various components of the electronic environment 20 together to enable these components to exchange electronic signals 60 (e.g., see the double arrow 60). At least a portion of the communications medium 38 is illustrated as a cloud to indicate that the communications medium 38 is capable of having a variety of different topologies including backbone, hub-and-spoke, loop, irregular, combinations thereof, and so on. Along these lines, the communications medium 38 may include copper-based devices and cabling, fiber optic devices and cabling, wireless devices, combinations thereof, etc.

During operation, the user 22 is capable of authenticating with the authentication server 34. In particular, the user 22 activates the soft token 40 running on the electronic apparatus 30 to obtain an authentication code 42 as part of an authentication attempt. The authentication code 42 includes a token code 44 (e.g., a one-time use password) and a set of biometric factors 46 (i.e., one or more biometric factors 46). The user 22 then delivers the authentication code 42 to the authentication server 34 in hope of successfully authenticating with the authentication server 34.

In some arrangements, the user 22 views the authentication code 42 on a display screen of the electronic apparatus 30, and then manually enters the authentication code 42 into an application running on the computing machine 32 (e.g., a web browser, a front-end program, an authentication client, etc.). This situation is illustrated by the two arrows 72, 74 adjacent the user 22. If authentication is successful, the user 22 is then able to access the computerized resource 50 using the computing machine 32. However, if authentication is unsuccessful, the user 22 is prohibited from accessing the computerized resource 50 using the computing machine 32.

In another arrangement, the electronic apparatus 30 automatically conveys the authentication code 42 to the computing machine 32 which then sends the authentication code 42 to the authentication server 34. Such operation can be viewed by the user 22 or be transparent to the user 22. This situation is illustrated by the dashed arrow 76 leading from the electronic apparatus to the computing machine 32. Again, the user 22 is only able to access the computerized resource 50 using the computing machine 32 if authentication is successful.

In yet another arrangement, the electronic apparatus 30 automatically sends the authentication code 42 directly to the authentication server 34. This situation is illustrated by the dashed arrow 78 leading from the electronic apparatus 30 to the communications medium 38. If authentication is successful, the authentication server 34 allows the user 22 to access the computerized resource 50. Otherwise, access to the computerized resource 50 is denied. Further details will now be provided with reference to FIG. 2.

Figure 2:
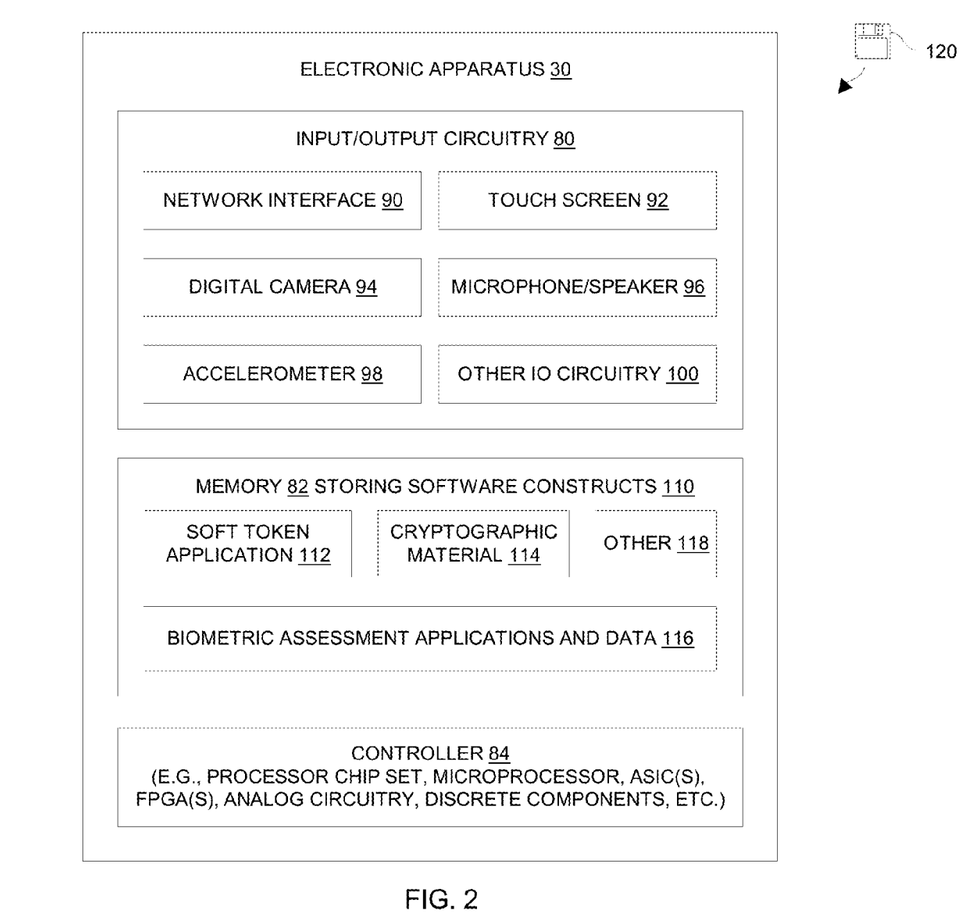
FIG. 2 is a block diagram of an electronic apparatus of the electronic environment of FIG. 1.

FIG. 2 shows particular details of the electronic apparatus 30 of the electronic environment 20. The electronic apparatus 30 includes input/output (IO) circuitry 80, memory 82, and a controller 84.

The IO circuitry 80 is constructed and arranged to control input and output for the electronic apparatus 30. The IO circuitry 80 includes a network interface 90 (e.g., a network card, a wireless transceiver, etc.) to connect the electronic apparatus 30 to the computing machine 32 and the communications medium 38, a touch screen 92 for user IO, a digital camera 94 to capture video images, a microphone and speaker set 96 to exchange audio IO, an accelerometer 98 to capture motion of the electronic apparatus 30, and other IO circuitry 100 (e.g., an actual keyboard, GPS circuitry, etc.).

The memory 82 includes volatile storage and non-volatile storage. The memory 82 stores a variety of memory constructs 110 including a soft token application 112, cryptographic material 114, biometric assessment applications and data 116, and other applications and data 118 (e.g., an operating system, control/status information, client applications, a phone book, etc.).

The controller 84 is constructed and arranged to execute and access the various memory constructs 110 stored therein. It should be understood that the controller 84 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 120 is capable of delivering all or portions of the software to the electronic apparatus 30. The computer program product 120 has a non-transitory (or non-volatile) computer readable medium which stores a set of instructions which controls one or more operations of the electronic apparatus 30. Examples of suitable computer readable storage media include tangible articles of manufacture and apparatus which store instructions in a non-volatile manner such as CD-ROM, flash memory, disk memory, tape memory, and the like.

During operation, the controller 84 executes the soft token application 112 to provide the authentication codes 42. In particular, the controller 84 generates token codes 44 from the cryptographic material 114 (e.g., a cryptographic key, derived keys, etc.), and obtains biometric measurements from the user 22 (also see FIG. 1) via one or more of the various IO circuits 80.

The controller 84 processes the biometric measurements by executing one or more of the biometric assessment applications 116. For example, the controller 84 can perform a facial recognition operation on images of the user's face captured using the camera 94. As another example, the controller 84 can perform a walking gait recognition operation to recognize the user via measurements gathered from the accelerometer 98, and so on.

Next, the controller 84 outputs a composite passcode as a current authentication code 42 for use in authenticating the user 22 to the authentication server 34. If authentication is successful, the user 22 is permitted access to the computerized resource 50. However, if authentication is unsuccessful, the user 22 is denied access to the computerized resource 50. Further details will now be provided with reference to FIGS. 3 and 4.

Figure 3:
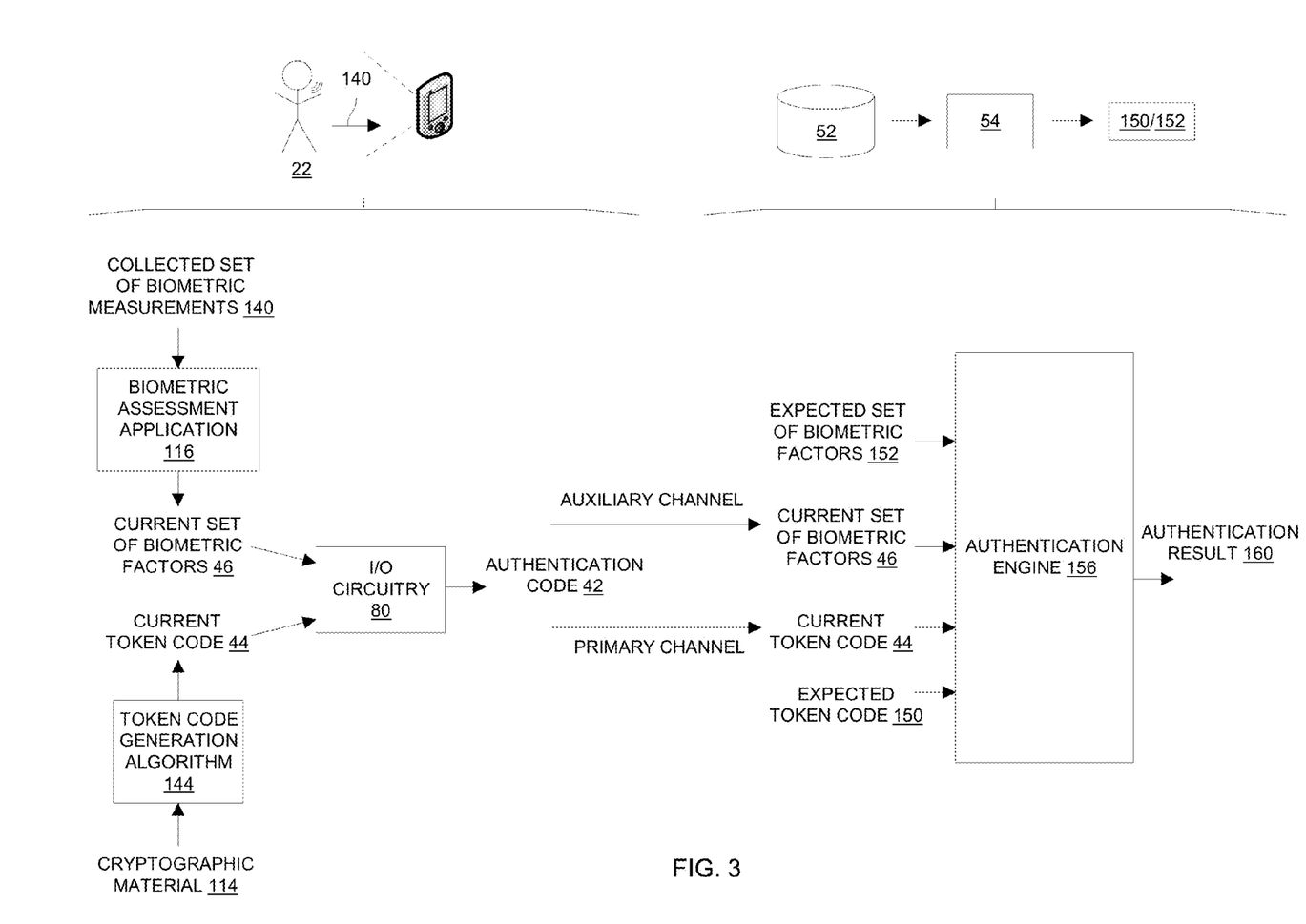
FIG. 3 is a block diagram of particular details of an operation of the electronic apparatus of FIG. 2.
Figure 4:
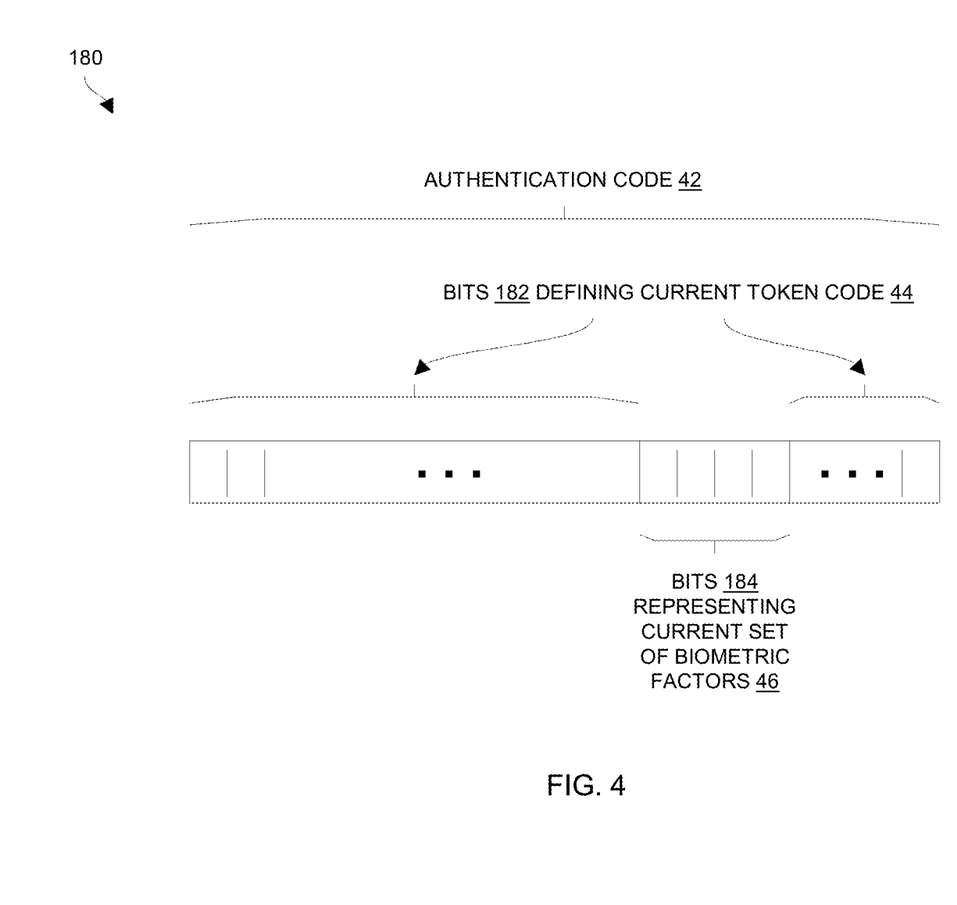
FIG. 4 is a block diagram of an example format of an authentication code utilized by the electronic environment of FIG. 1.

FIGS. 3 and 4 pictorially show certain details of an example authentication process which is performed during an authentication attempt. FIG. 3 shows certain authentication activities which occur within the electronic apparatus 30 and the authentication server 34. FIG. 4 shows an example multi-channel format for the authentication code 42.

As shown in FIG. 3, the electronic apparatus 30 collects a set of current biometric measurements 140 from the user 22. Recall that suitable biometric measurements 140 may include, among other things, images of the user's face for face recognition, samples of the user's voice for voice recognition, accelerometer measurements for walking gait recognition. In particular, the touch screen 92 is extremely well suited for obtaining contact-based input such as typing speed, typing rhythm, swiping habits, frequent finger pressure, typical resistance/capacitance/etc. from the user's hand, and so on.

Next, a biometric assessment application 116 assesses the collected set of current biometric measurements 140. In some arrangements, the biometric assessment application 116 compares the set of current biometric measurements 140 to a set of expected biometric measurements 142 (or a template) and provides, as the current set of biometric factors 46, a binary result (e.g., match vs. no match) based on the comparison. For example, the application 116 can compare current facial geometries to locally stored facial geometries collected over time (e.g, ear shape/size, eye/nose/mouth lengths, distances between facial features, etc.). In other arrangements, the application 116 compares the set of current biometric measurements 140 to a set of expected biometric measurements 142 and provides, as the current set of biometric factors 46, a closeness score (e.g., a rating which indicates how well the sets match each other) to indicate the level of risk (e.g., low, medium, high, etc.). In yet other arrangements, the application 116 outputs a processed biometric measurement 140 as a current biometric factor 46 (e.g., a normalized eye/nose distance, typing rate, etc.).

While such biometric processing is taking place or around this time, the electronic apparatus 30 generates a current token code 44 using a token code generation algorithm 144. In some arrangements, the soft token 40 (FIG. 1) generates an OTP based on the cryptographic material 114 (FIG. 2).

The electronic apparatus 30 then combines a current token code 44 with the current set of biometric factors 46 to form a current authentication code 42. The authentication code 42 is then sent from the electronic apparatus 30 to the authentication server 34 directly or indirectly (see paths 72-78 in FIG. 1). In some arrangements, these are conveyed to the authentication server 34 in the form of a single embedded signal. In other arrangements, these are conveyed separately (i.e., out of band from each other). In both arrangements, the token code flow is considered a primary channel between the soft token 40 and the authentication server 34, and the flow of biometric factors 46 is considered an auxiliary channel between the soft token 40 and the authentication server 34. It should be understood that other information is capable of being conveyed in the auxiliary channel as well such as a silent alarm signal, electronic environmental data, soft token cloning information, etc.

FIG. 4 shows an example format 180 for the authentication code 42 when the authentication code 42 is in the form of a single signal which can be presented as a string of alphanumeric characters. In this format 180, the authentication code 42 includes a first set of bits 182 which represent the current token code 44 and a second set of bits 184 which represent the current set of biometric factors 46. The authentication code 42 may take the form of a fixed number of hexadecimal values (e.g., 6 hex digits, 8 hex digits, 10 hex digits, etc.), ASCII values, and so on.

In some arrangements, the particular placement of the bits 184 representing the biometric factors 46 is obfuscated to make it difficult, among other things, to ascertain the current token code 44 and the current set of biometric factors 46. However, the particular placement is known to the authentication server 34 so that the authentication server 34 is able to properly extract the current token code 44 and the current set of biometric factors 46 from the authentication code 42. In some arrangements, the particular bit placements remain static. In other arrangements, the particular bit placements change (e.g., over time, due to a change in state, etc.).

With attention back on FIG. 3, the authentication server 34 generates an expected token code 150 and an expected set of biometric factors 152 for authenticating the user 22. In particular, as part of the current authentication attempt, it should be understood that the user 22 has separately provided a user identifier (i.e., who the user 22 claims to be). The authentication server 34 retrieves a particular user profile 54 from the user database 52 corresponding to the user identifier, and then generates the expected token code 150 and the expected set of biometric factors 152 from data in that user profile 54 (e.g., cryptographic material, previous biometric factors 46, templates of the user 22, etc.).

Next, an authentication engine 156 of the authentication server 34 inputs the current token code 44 and the current set of biometric factors 46 received from the electronic apparatus 30, as well as the locally generated expected token code 150 and expected set of biometric factors 152. The authentication engine 156 evaluates these inputs and then provides an authentication result 160 indicating whether authentication is successful.

In some arrangements, the authentication engine 156 performs a traditional multi-factor authentication operation. That is, the authentication engine 156 performs side-by-side comparisons of multiple authentication factors (i.e., OTPs, biometrics, etc.) when determining the authentication result 160.

In other arrangements, the authentication engine 156 performs a weighted evaluation of several risk-based authentication factors in addition to assessing the token code 44 and the biometrics. Here, the authentication server 34 performs a risk-based authentication operation which includes both the result of the token code comparison as well as the set of biometric factors 46 to form an authentication score. This authentication score provides an overall assessment of the level of risk. For example, the higher the score the higher the risk, and the lower the score the lower the risk. Eventually, the authentication server 34 performs a final assessment of the risk score and outputs, as the authentication result 160, an indication of whether authentication is successful. The final assessment may include a comparison of the risk score to a risk threshold, a normalization of the risk score into a particular risk percentile, and so on.

The authentication result 160 is then used to allow or deny access to a computerized resource 50 (also see FIG. 1). For example, if authentication is successful, the authentication server 34 may send a signal to the resource server 36 which enables the user 22 to access a computer resource 50 (e.g., open a file, access an account, perform a transaction, etc.) on the resource server 36 through the computing machine 32. As another example, if authentication is successful, the authentication server 34 may send a signal to the computing machine 32 to allow the user to access a computer resource 50 on the computing machine 32, and so on.

It should be understood that, in some arrangements, the electronic apparatus 30 is able to perform biometric assessment operations to recognize conscious behavior. That is, rather than simply record objective typing input from the user, the electronic apparatus 30 monitors the user's ability to react to his or her environment in a way previously taught to the user 22 or otherwise acquired. In other words, the user 22 reacts in a conscious way to his or her environment by entering biometrics (i.e., not just recording standard user input objectively). This includes but is not limited to learning how to respond in certain circumstances. Along these lines, the user 22 may even be trained (or rely on implicit memory) to deliberately mistype input into the electronic device 30 (e.g., a request for a code) and then correct the input in order to indicate a hostage situation. In such situations, the electronic apparatus 30 detects the deliberate mistyping and typing correction event provided by the user and includes, in the set of biometric factors 46, an alert indicating user distress to the authentication server 34.

In the context of an alert signaling user distress, the authentication server 34 is capable of indicating unsuccessful authentication in the authentication result 160, but also enacting remedial activity. For example, the authentication server 34 is capable of informing authorities, locking out computer resources 50, attempting to transparently collect additional information from the user, and so on. Further details will now be provided with reference to FIG. 5.

Figure 5:
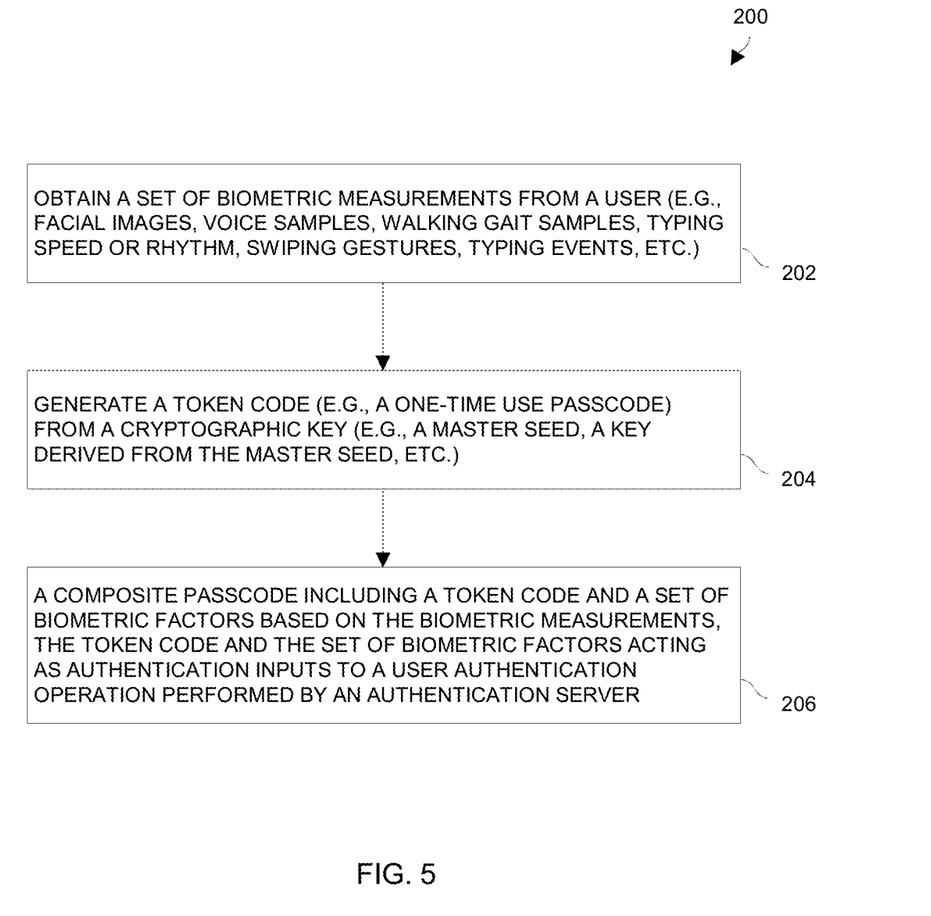
FIG. 5 is a flowchart of a procedure which is performed by the electronic apparatus of FIG. 2.

FIG. 5 is a flowchart of a procedure 200 which is performed by the electronic apparatus 30 to provide authentication codes 42 to authenticate the user 22 to the authentication server 32. In step 202, the electronic apparatus 30 obtains a set of biometric measurements 140 from the user 22 (also see FIG. 3). Examples include facial images, voice samples, walking gait samples, typing speed or rhythm, swiping gestures, typing events, etc.

In step 204, the electronic apparatus 30 generates a token code 44 from a cryptographic key. The token code 44 may be an OTP derived from the cryptographic key. The cryptographic key may be a derivative key derived from a master seed. It should be understood that a variety of OTP generation schemes are suitable for use.

In step 206, the electronic apparatus 30 outputs, as the authentication code 42, a composite passcode including a token code 44 and a set of biometric factors 46 based on the biometric measurements 140. The token code 44 and the set of biometric factors 46 act as authentication inputs to a user authentication operation performed by the authentication server 34.

As mentioned above, an improved technique provides authentication codes 42 which include token codes 44 and biometric factors 46. Such biometric factors 46 can be acquired from the various input circuits which are now commonly available and even offered as standard equipment on many electronic apparatus 30 (e.g., smart phones, tablets, laptops, etc.). Accordingly, the authentication codes 42 are now able to provide a primary channel which carries token codes and an auxiliary channel which carries the biometric factors. As a result, such operation provides the opportunity for richer (i.e., stronger) authentication as well as detection of alerts from the user 22.

While various embodiments of the present disclosure have been particularly shown and described, it will be understood by those skilled in the art that various changes in form and details may be made therein without departing from the spirit and scope of the present disclosure as defined by the appended claims. For example, the auxiliary channel which carries the biometric factors 46 was described above as being closely tied to the primary channel which carries the token codes 44, by way of example only. In particular, the biometric factors 46 were described as being embedded with the token codes 44 in a single signal (e.g., an authentication code 42 in the form of a series of alphanumeric characters) which is then conveyed to the authentication server 34 (FIG. 4). In other arrangements, the auxiliary channel is separate from the primary channel. That is, the primary channel may contain token codes 44 and be conveyed from the electronic apparatus 30 to the authentication server 34 in a traditional manner (e.g., a user 22 entering a code in response to a prompt, etc.). However, the auxiliary channel may take the form of a separate pathway if such a pathway is available. Along these lines, if the electronic apparatus 30 is a mobile device such as a smart phone or a tablet, the electronic apparatus 30 may send the biometric factors 46 via a wireless signal (e.g., Wi-Fi, Bluetooth, cellular telephony, etc.). Such enhancements and modifications may provide greater bandwidth and richer biometric data than would otherwise be available in an embedded signal.

Additionally, in some arrangements, communications between the electronic apparatus 30 and the authentication server 34 include more than two channels. For example, such communications may include a primary channel to convey token codes 44, an auxiliary channel to convey auxiliary data (e.g., hardware fingerprints, software posture, etc.), and a silent alarm channel to convey a silent alarm state which is used to alert the authentication server 34 that one or more critical events have occurred (e.g., a tamper event, a cloning event, an anomaly such as a change in time direction, etc.). In these arrangements, the biometric factors 46 can be conveyed through any of the channels (e.g., the primary channel, the auxiliary channel, or the silent alarm channel).

Furthermore, the authentication code 42 was described above as including a first set of bits 182 which represent the current token code 44 and a second set of bits 184 which represent the current set of biometric factors 46 (see FIG. 4). In particular, it was explained that the placement of the bits could be changed to obfuscate which bits formed the current token code 44 and which bits defined the set of biometric factors 46. It should be understood that there are many suitable ways to embed auxiliary bits within an authentication code 42. In some arrangements, an embedder circuit appends the bits of the biometric factors 46 to the token code 44, and subjects the combination to a reversible blending operation. The blending operation is known to the authentication server 34, which then reverses the blending operation when authentication codes 42 are received, to extract the bits of the biometric factors 46 and the token code 44.

Additionally, it should be understood that there is no need to store old biometric measurements 140 in the electronic apparatus 30 (e.g., to avoid unnecessary privacy leakage). Rather, the electronic apparatus 30 simply stores a fuzzy commitment or fuzzy extraction of a biometric template. In this way a measured biometric is checked to correspond to the fuzzy extraction/commitment without need to access actual biometric measurements 140 which had been previously captured.

Furthermore, an example of the authentication system's ability to recognize conscious behavior was described above in the context of a user purposefully mistyping and correcting entry of an authentication code in order to alert the soft token 40 to generate a distress code. In some arrangements, the user can simply enter an alternate PIN that triggers a distress state in hostage situations. In other arrangements (e.g., where an alternate PIN is too suspicious), the user can also use the correct authentication code 42 but, in addition to mistyping and correcting, use certain delay patterns, mistype certain characters, and so on in order to generate a distress passcode. Such modifications and enhancements are intended to belong to various embodiments and arrangements of the current disclosure.

What is claimed is:

1. A method of providing authentication codes to authenticate a user to an authentication server, the method comprising:

generating, by an electronic apparatus, token codes from a cryptographic key;

obtaining, by the electronic apparatus, biometric measurements from a user; and outputting, by the electronic apparatus, composite passcodes as the authentication codes;

wherein the composite passcodes include the token codes and biometric factors based on the biometric measurements;

wherein the token codes and the biometric factors of the composite passcodes act as authentication inputs to user authentication operations performed by the authentication server;

wherein the electronic apparatus is a mobile device which stores the cryptographic key and which runs a soft token application;

wherein generating the token codes from the cryptographic key includes deriving, as the token codes, a series of one-time use passwords (OTPs) based on the cryptographic key using the soft token application, each OTP being valid during a respective time window and invalid outside that respective time window;

wherein the mobile device is equipped with a set of biometric assessment applications;

wherein the method further comprises processing, by the mobile device, the biometric measurements using the set of biometric assessment applications to form the biometric factors based on the biometric measurements;

wherein the set of biometric assessment applications includes a typing recognition application;

wherein obtaining the biometric measurements from the user includes capturing, by a keyboard of the mobile device, a set of current typing samples from the user during a current authentication attempt;

wherein processing the biometric measurements using the set of biometric assessment applications includes identifying, using the typing recognition application, a deliberate mistyping and typing correction event provided by the user; and wherein outputting the composite passcodes as the authentication codes includes providing an alert to signal user distress to the authentication server in response to identification of the deliberate mistyping and typing correction event.

2. A method as in claim 1 wherein the set of biometric assessment applications further includes (i) a set of physiological characteristic recognition applications to compare current physiological measurements of the user to expected physiological measurements stored in the mobile device and (ii) a set of behavioral characteristic recognition applications to compare current behavioral measurements of the user to expected behavioral measurements stored in the mobile device; and wherein the method further comprises:

performing a discovery operation to identify which physiological measurements and behavioral measurements are capable of being captured by the mobile device to run only a subset of the set of biometric assessment applications on the mobile device.

3. A method as in claim 2, further comprising:

running different biometric assessment applications during different authentication attempts to alternate among the biometric assessment applications.

4. A method as in claim 1 wherein processing the biometric measurements using the set of biometric assessment applications to form the biometric factors further includes:

providing, as a biometric factor, a binary result indicating whether biometric recognition is successful or unsuccessful.

5. A method as in claim 1 wherein processing the biometric measurements using the set of biometric assessment applications to form the biometric factors further includes:

providing, as a biometric factor, a multi-bit score indicating a level of closeness between a current biometric measurement and an expected biometric measurement.

6. A method as in claim 1 wherein processing the biometric measurements using the set of biometric assessment applications to form the biometric factors further includes:

providing, as a biometric factor, a multi-bit biometric measurement.

7. A method as in claim 1 wherein outputting the composite passcodes further includes:

visually displaying, as a composite passcode for a particular authentication attempt, a character string sequence to the user through a display of the mobile device, the character string sequence defining a OTP and a biometric factor, the biometric factor defined by the character string sequence being un-discernable to the user.

8. A method as in claim 1 wherein outputting the composite passcodes further includes:

transmitting, as a composite passcode for a particular authentication attempt, a character string sequence to the authentication server from the mobile device, the character string sequence defining a OTP and a biometric factor.

9. An electronic apparatus, comprising:

input/output (IO) circuitry;

memory which stores a cryptographic key; and a controller coupled to the IO circuitry and the memory, the controller being constructed and arranged to:

generate token codes from the cryptographic key, obtain biometric measurements from a user through the IO circuitry, and output, as authentication codes, composite passcodes through the IO circuitry;

wherein the composite passcodes include the token codes and biometric factors based on the biometric measurements;

wherein the token codes and the biometric factors of the composite passcodes act as authentication inputs to user authentication operations performed by an authentication server;

wherein the controller, when obtaining the biometric measurements from the user, is constructed and arranged to capture, via the IO circuitry, a set of current typing samples from the user during a current authentication attempt;

wherein the controller is further constructed and arranged to identify, using a typing recognition application, a deliberate mistyping and typing correction event provided by the user; and wherein the controller, when outputting the composite passcodes as the authentication codes, is constructed and arranged to provide an alert to signal user distress to the authentication server in response to identification of the deliberate mistyping and typing correction event.

10. An electronic apparatus as in claim 9 wherein the memory further stores a soft token application and a set of biometric assessment applications which includes the typing recognition application;

wherein the controller, when generating the token codes from the cryptographic key, is constructed and arranged to derive, as the token codes, a series of one-time use passwords (OTPs) based on the cryptographic key using the soft token application, each OTP being valid during a respective time window and invalid outside that respective time window; and wherein the controller is further constructed and arranged to process the biometric measurements using the set of biometric assessment applications to form the biometric factors based on the biometric measurements.

11. An electronic apparatus as in claim 10 wherein the electronic apparatus is a mobile device; and wherein the controller, when outputting the composite passcodes, is constructed and arranged to:

visually display, as a composite passcode for a particular authentication attempt, a character string sequence to the user through a display of the mobile device, the character string sequence defining a OTP and a biometric factor, the biometric factor defined by the character string sequence being un-discernable to the user.

12. An electronic apparatus as in claim 10 wherein the electronic apparatus is a mobile device; and wherein the controller, when outputting the composite passcodes, is constructed and arranged to:

transmit, as a composite passcode for a particular authentication attempt, a character string sequence to the authentication server from a transmitter of the mobile device, the character string sequence defining a OTP and a biometric factor.

13. A computer program product which includes a non-transitory computer readable medium storing a set of instructions to provide authentication codes to authenticate a user to an authentication server, the set of instructions causing computing circuitry to perform a method, comprising:

generating, by the computing circuitry, token codes from a cryptographic key;

obtaining, by the computing circuitry, biometric measurements from a user; and outputting, by the computing circuitry, composite passcodes as the authentication codes;

wherein the composite passcodes include the token codes and biometric factors based on the biometric measurements;

wherein the token codes and the biometric factors of the composite passcodes act as authentication inputs to user authentication operations performed by the authentication server;

wherein obtaining the biometric measurements from the user includes capturing a set of current typing samples from the user during a current authentication attempt;

wherein the method further comprises identifying, using a typing recognition application, a deliberate mistyping and typing correction event provided by the user; and wherein outputting the composite passcodes as the authentication codes includes providing an alert to signal user distress to the authentication server in response to identification of the deliberate mistyping and typing correction event.

14. A method of providing authentication codes to authenticate a user to an authentication server, the method comprising:

generating, by an electronic apparatus, token codes from a cryptographic key;

obtaining, by the electronic apparatus, biometric measurements from a user; and outputting, by the electronic apparatus, composite passcodes as the authentication codes;

wherein the composite passcodes include the token codes and biometric factors based on the biometric measurements;

wherein the token codes and the biometric factors of the composite passcodes act as authentication inputs to user authentication operations performed by the authentication server wherein obtaining the biometric measurements from the user includes capturing a set of current typing samples from the user during a current authentication attempt;

wherein the method further comprises identifying, using a typing recognition application, a deliberate mistyping and typing correction event provided by the user; and wherein outputting the composite passcodes as the authentication codes includes providing an alert to signal user distress to the authentication server in response to identification of the deliberate mistyping and typing correction event.

15. A method as in claim 1 wherein the set of biometric assessment applications further includes a facial recognition application;

wherein obtaining the biometric measurements from the user further includes capturing, by a camera of the mobile device, a set of current images of the user's face; and wherein processing the biometric measurements using the set of biometric assessment applications further includes performing, using the facial recognition application, a facial recognition operation on the set of current images of the user's face.

16. A method as in claim 1 wherein the set of biometric assessment applications further includes a voice recognition application;

wherein obtaining the biometric measurements from the user further includes capturing, by a microphone of the mobile device, a set of current voice samples of the user's voice; and wherein processing the biometric measurements using the set of biometric assessment applications further includes performing, using the voice recognition application, a voice recognition operation on the set of current voice samples of the user's voice.

17. A method as in claim 1 wherein the set of biometric assessment applications further includes a walking gait recognition application;

wherein obtaining the biometric measurements from the user further includes capturing, by an accelerometer of the mobile device, a set of current gait samples; and wherein processing the biometric measurements using the set of biometric assessment applications further includes performing, using the walking gait recognition application, a gait recognition operation on the set of current gait samples.

18. A method as in claim 1 wherein the set of biometric assessment applications further includes a touch recognition application;

wherein obtaining the biometric measurements from the user further includes capturing, by a touchscreen of the mobile device, a set of current touch samples of the user's hand; and wherein processing the biometric measurements using the set of biometric assessment applications further includes performing, using the touch recognition application, a touch recognition operation on the set of current touch samples.

19. A method as in claim 1 wherein the set of biometric assessment applications further includes a hand gesture recognition application;

wherein obtaining the biometric measurements from the user further includes capturing, by a touchscreen of the mobile device, a set of current hand gesture samples of the user's hand; and wherein processing the biometric measurements using the set of biometric assessment applications further includes performing, using the hand gesture recognition application, a hand gesture recognition operation on the set of current hand gesture samples.

* * * * *